United States Patent
Diamanti et al.

(10) Patent No.: US 8,830,655 B2
(45) Date of Patent: Sep. 9, 2014

(54) TABLESS ROLL CAPACITOR AND CAPACITOR STACK

(75) Inventors: Paolo Diamanti, Maple (CA); Lorin Bratu, Pickering (CA); Ross McTaggart, Markham (CA); Jorge Ribeiro, Etobicoke (CA); Keith Lobban, Caledon (CA)

(73) Assignee: Trench Limited, Toronto (CA)

( * ) Notice: Subject to any disclaimer, the term of this patent is extended or adjusted under 35 U.S.C. 154(b) by 184 days.

(21) Appl. No.: 13/423,393

(22) Filed: Mar. 19, 2012

(65) Prior Publication Data

US 2012/0243144 A1   Sep. 27, 2012

Related U.S. Application Data

(60) Provisional application No. 61/466,265, filed on Mar. 22, 2011.

(51) Int. Cl.
| | |
|---|---|
| H01G 4/38 | (2006.01) |
| H01G 4/002 | (2006.01) |
| H01G 4/005 | (2006.01) |
| H01G 4/06 | (2006.01) |

(52) U.S. Cl.
CPC ............. *H01G 4/06* (2013.01); *H01G 4/002* (2013.01); *H01G 4/38* (2013.01); *H01G 4/005* (2013.01)
USPC ........... 361/329; 361/303; 361/305; 361/312; 361/328; 361/330

(58) Field of Classification Search
USPC ........... 361/303, 305, 301.2, 301.4, 311–313, 361/328–329
See application file for complete search history.

(56) References Cited

U.S. PATENT DOCUMENTS

| | | | |
|---|---|---|---|
| 3,398,339 A | 8/1968 | Pierpont et al. | |
| 3,508,128 A | 4/1970 | Allison | |
| 3,522,498 A | 8/1970 | Price | |
| 3,692,928 A | 9/1972 | Friedrich | |
| 3,705,336 A | 12/1972 | Kalstein | |
| 3,870,926 A | 3/1975 | Hughes | |
| 3,870,927 A | 3/1975 | Hughes | |
| 4,163,956 A | 8/1979 | Garlington et al. | |
| 4,320,437 A * | 3/1982 | Shaw et al. | 361/303 |
| 4,345,298 A * | 8/1982 | Grahame | 361/273 |
| 4,439,812 A * | 3/1984 | Chapman | 361/314 |
| 4,480,285 A | 10/1984 | Grahame | |
| 4,486,810 A | 12/1984 | Tomita et al. | |
| 4,623,953 A | 11/1986 | Dakin | |
| 5,012,179 A | 4/1991 | Okumura | |
| 6,529,363 B2 | 3/2003 | Waffenschmidt et al. | |
| 7,983,019 B2 | 7/2011 | Gosselin | |
| 7,995,327 B2 | 8/2011 | Carlen et al. | |

* cited by examiner

*Primary Examiner* — Nguyen T Ha

(57) ABSTRACT

A capacitor (20A-E) formed as a roll of inner and outer electrode strips (21, 23) alternating with inner and outer dielectric strips (22, 24). Each of the dielectric strips (22, 24) is shorter than an inwardly adjacent one of the electrode strips (21, 23) at a radially outer end thereof (21 E, 23E). This exposes the radially outer end of each electrode strip on respectively different portions of an outer side surface (26, 28) of the capacitor. The exposed ends of the electrode strips may be arranged on opposite sides of the capacitor, such that stacking the capacitors interconnects them either in parallel, in series, or in combinations thereof in different embodiments.

20 Claims, 8 Drawing Sheets

TABLESS ROLL CAPACITOR AND CAPACITOR STACK

This application claims benefit of the 22 Mar. 2011 filing date of U.S. provisional patent application No. 61/466,265 which is incorporated by reference herein.

FIELD OF THE INVENTION

The invention relates generally to roll capacitors and to capacitor stacks formed of a plurality of roll capacitors, and more particularly, to roll capacitors connected in parallel and/or series for capacitor voltage transformers, and to assembly thereof.

BACKGROUND OF THE INVENTION

Roll capacitors are formed by rolling two electrode strips separated by dielectric strips. This forms a more compact capacitor than a flat plate capacitor with equivalent capacitance. Capacitor chains can be made by stacking multiple roll capacitors, then interconnecting them with conductive tabs that extend beyond the ends of the capacitors between respective electrode strips in adjacent rolls. This is seen for example in FIG. 4 of U.S. Pat. No. 3,508,128 and in FIG. 2 of U.S. Pat. No. 4,623,953. Capacitor chains are used, for example, in capacitor voltage transformers and other applications in the Medium to Ultra-High Voltage system applications, such as: instrument transformers (protection, supervisory control, data acquisition, metering and harmonics monitoring), power line carrier, system network compensation, voltage dividers and tuned filter applications, for example.

BRIEF DESCRIPTION OF THE DRAWINGS

The invention is explained in the following description in view of the drawings that show.

DETAILED DESCRIPTION OF THE INVENTION

The present inventors have recognized that assembling and interconnecting the conductive tabs of roll capacitors to form capacitor chains is labor intensive, slow, expensive, and subject to human error. The tabs are subject to mechanical stress and cyclic thermal expansion that can fatigue and weaken the electrode strips and dielectric strips. The tabs extend beyond the footprint of the capacitors, thus requiring additional chamber width when enclosed within a porcelain insulator or other containment housing, such as is common for capacitor voltage transformer applications. An improved capacitor design useful for forming capacitor chains is disclosed herein.

Figure 1:
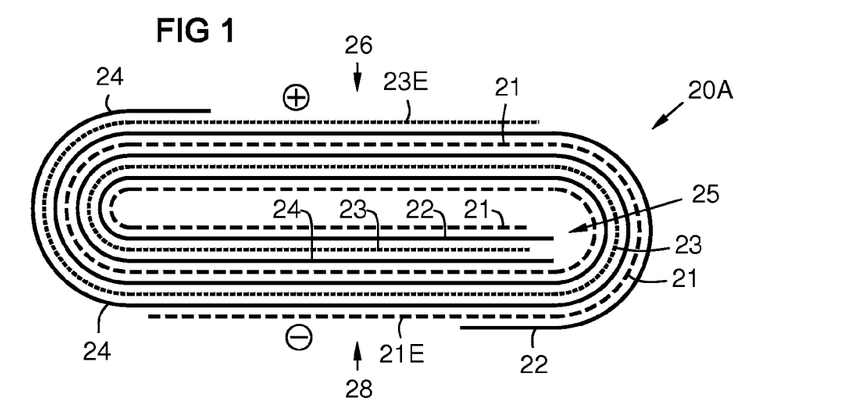
FIG. 1 is a sectional end view of a roll capacitor in a first embodiment of the invention.
Figure 2:
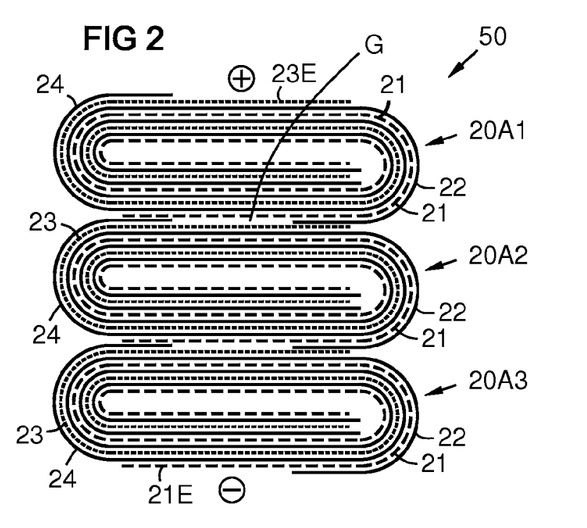
FIG. 2 shows a stack of roll capacitors of the first embodiment.

FIG. 1 shows a roll capacitor 20A with inner and outer electrode strips 21, 23 separated by inner and outer dielectric strips 22, 24. The designations "inner" and "outer" are best seen at the innermost lap 25 of the strips, since both electrodes 21, 23 and both dielectrics 22, 24 are finally "outer" on different parts of the roll outer surface. The electrodes 21, 23 are designated with charges + or − for convenience only to show relative charges in each embodiment. These designations are reversible. The electrodes 23, 21 have exposed end portions 23E, 21E on opposite sides 26, 28 of the roll 20A for electrical contact. The term "side" of a roll herein means a portion of the outer surface of the roll facing in a given direction, such as first and second sides 26, 28 in the figures. The term "side" in this context is not intended to include the ends of the roll. Pluralities of these capacitors 20A inherently interconnect by direct stacking contact between the exposed ends 21E, 23E of the electrodes when they are stacked as shown in FIG. 2. No interconnection tabs are needed as are needed in the prior art.

Capacitor embodiment 20A may be described as a roll of four adjacent strips 21, 22, 23, 24 including, in a radially inward to outward sequence, an inner electrode 21, an inner dielectric 22, an outer electrode 23, and an outer dielectric 24. In general, the roll capacitors herein may be described as a roll of four adjacent strips 21, 22, 23, 24 including inner 21 and outer 23 electrode strips alternating with inner 22 and outer 24 dielectric strips, wherein the two electrode strips 21, 23 have respective exposed radially outer ends 21E, 23E on a portion or side 26, 28 of an outer side surface of the roll. A radially outer end of each dielectric strip 22, 24 is shorter than an inwardly adjacent one of the electrode strips on the outer side surface of the roll, exposing the outer end 21E, 23E of the electrode strip. In some embodiments, one or both dielectric strips 22, 24 may be short enough to expose one or both electrode strips 21, 23 on both sides of the roll, as later shown.

Figure 3:
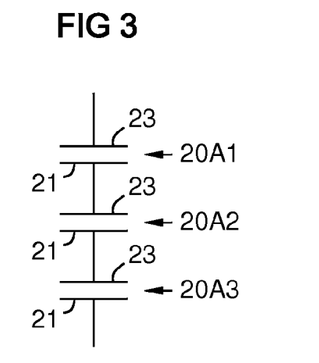
FIG. 3 shows an electrical diagram of the stack of FIG. 2.
Figure 4:
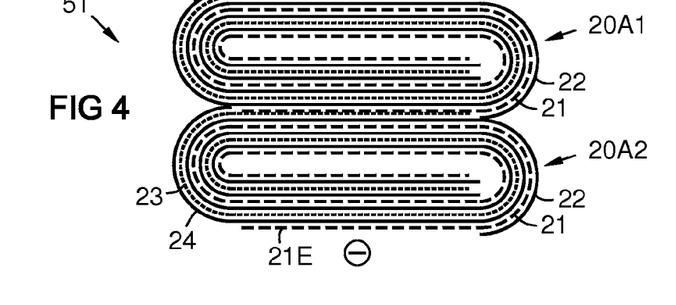
FIG. 4 shows a stack of roll capacitors with shorter dielectric strips than in FIG. 2.

FIG. 2 shows a stack of three electrically interconnected capacitors 20A1, 20A2, and 20A3. FIG. 3 shows an electrical diagram of the stack of FIG. 2. Capacitors 20A1, 20A2, and 20A3 are connected in series. The inner electrode 21 of each roll contacts the outer electrode 23 of the next roll in the stack. A gap G between adjacent contacts 21, 23 is illustrated in the stack 50 and others herein, but this gap is eliminated by compressing the stack vertically in a chamber as later described. FIG. 4 shows a stack 51 of two roll capacitors 20A1 and 20A2 with dielectric strips 22, 24 that are shorter than in FIG. 2, eliminating the gap G that is seen is FIG. 2.

Figure 5:
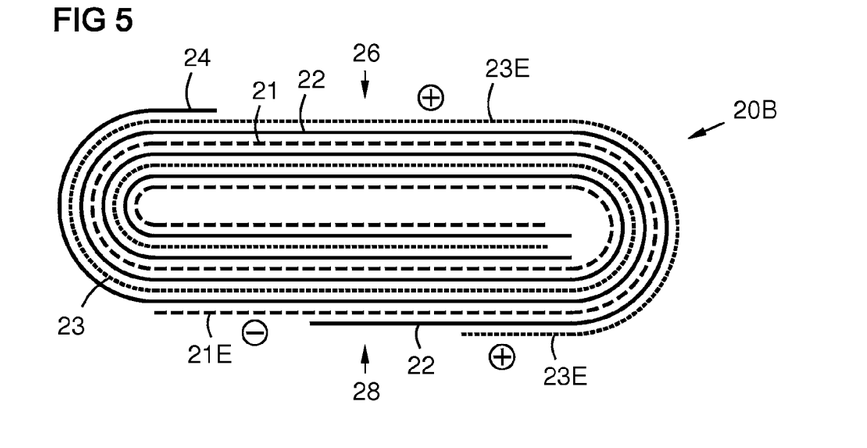
FIG. 5 is a sectional end view of a roll capacitor of a second embodiment.

FIG. 5 shows a roll capacitor 20B with inner and outer electrode strips 21, 23, alternating with inner and outer dielectric strips 22, 24. The electrodes 21, 23 have respective exposed end portions 21E, 23E on opposite sides 26, 28 of the roll 20B for electrical contact. This provides inherent electrical interconnection of the capacitors 20B when they are stacked. In addition, the outer electrode 23 is exposed on both sides 26, 28 of the roll. This provides a serial connection of two adjacent rolls 20B in one orientation, and a parallel connection in another orientation.

Figures 6, 7:
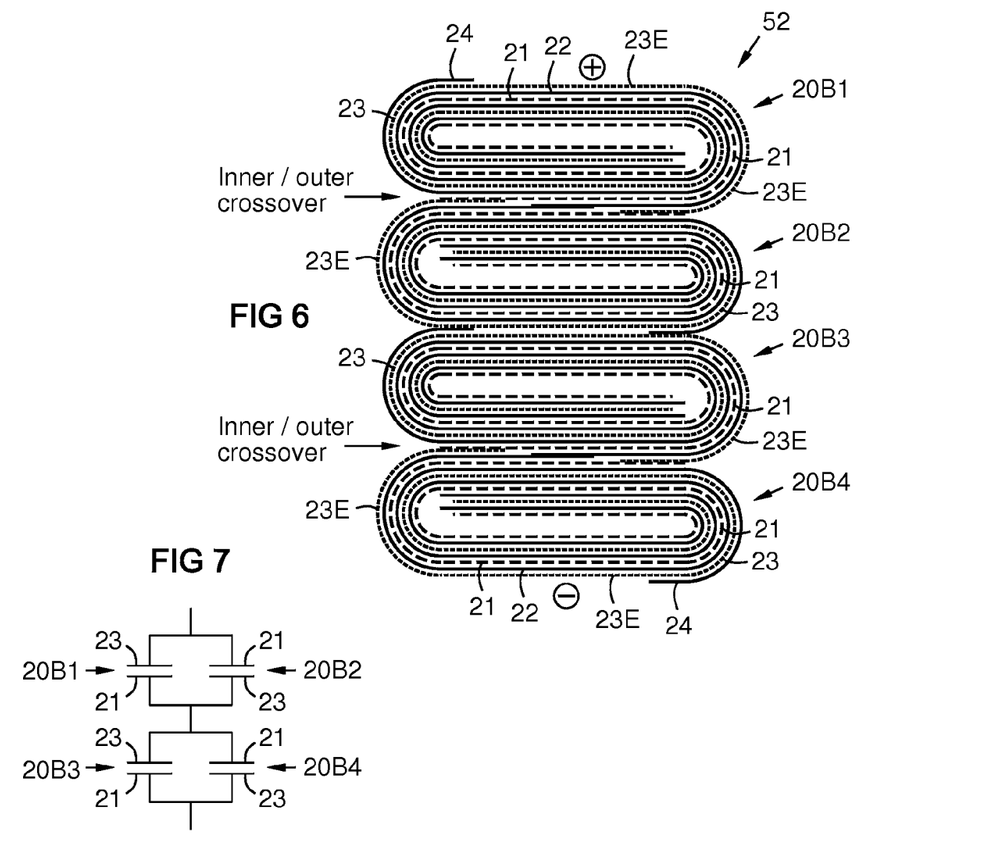
FIG. 6 shows a stack of capacitors of the second embodiment.
FIG. 7 shows an electrical diagram of the stack of FIG. 6.

FIG. 6 shows a stack 52 of four electrically interconnected roll capacitors 20B1, 20B2, 20B3 and 20B4. Each capacitor is inverted with respect to the previous capacitor in the stack. The second sides 28 of capacitors 20B1 and 20B2 are in mutual contact, such that electrodes 21, 23 of 20B1 contact both electrodes 23, 21 of 20B2 respectively in a crossover as shown. This means the inner electrode 21 of capacitor 20B1 contacts the outer electrode 23 of capacitor 20B2, and the outer electrode 23 of 20B1 contacts the inner electrode 21 of 20B2, creating a parallel connection between them. Capacitor 20B3 is inverted with respect to 20B2 such that their respective first sides 26 are in mutual contact. In this orientation, capacitors 20B2 and 20B3 are connected in series. Capacitor 20B4 is inverted with respect to 20B3 such that they are connected in parallel, as described above for the connection between 20B1 and 20B2. The circuit resulting from the stack 52 of FIG. 6 is illustrated in FIG. 7. Capacitor embodiment 20B allows connecting any two adjacent capacitors either in series or in parallel. If more than two capacitors in a row are to be connected in series or parallel, this can be done with other embodiments herein, either alone or in combination with embodiment 20B.

Figure 8:
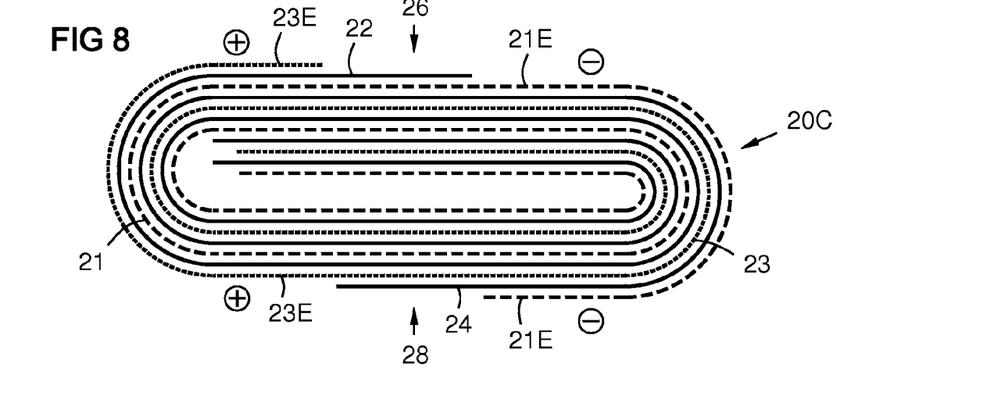
FIG. 8 is a sectional end view of a roll capacitor of a third embodiment.

FIG. 8 shows a roll capacitor 20C with inner and outer electrode strips 21, 23, alternating with inner and outer dielectric strips 22, 24. Both electrodes 21, 23 have exposed end portions 21E, 23E that extend to both opposite sides 26, 28 of the roll 20B for electrical contact. Capacitors of this type 20C may be stacked by placing the second side 28 of a first capacitor 20C1 against the first side 26 of a second capacitor 20C2, creating a parallel interconnection.

Figure 9:
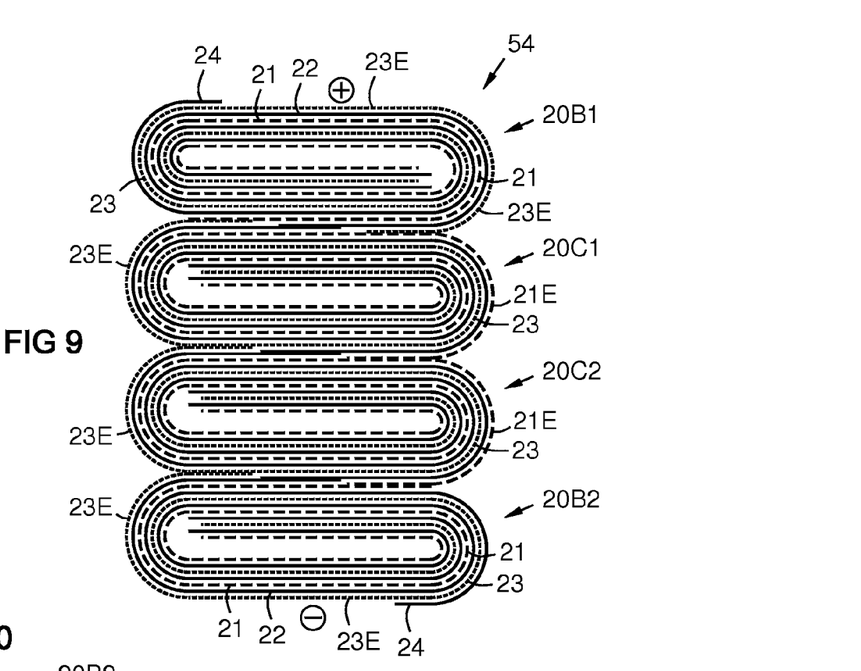
FIG. 9 shows a stack of capacitors of the second and third embodiments.
Figure 10:
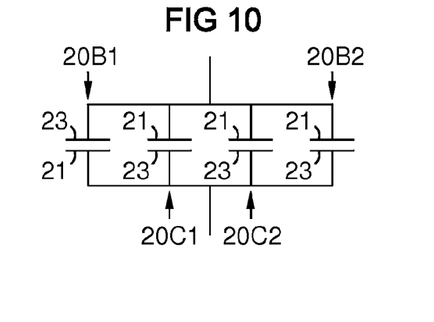
FIG. 10 shows an electrical diagram of the stack of FIG. 9.

FIG. 9 shows a stack 54 of four electrically interconnected roll capacitors 20B1, 20C1, 20C2 and 20B4. This stack has parallel connections between 20B1 and 20C1, between 20C1 and 20C2, and between 20C2 and 20B2 as shown in FIG. 10. Any number of capacitors 20C may be interconnected in parallel by stacking them as per 20C1 and 20C2. Each end of a stack of capacitors of type 20C can be finished with a capacitor 20B as shown by 20B1 and 20B2. This arrangement provides a single respective + or − contact at each end of the stack 54 for circuit connections, which can alternately be used for a series connection to additional capacitors as later shown. Capacitor 20B2 is inverted with respect to capacitor 20B1 in this stack arrangement 54.

Figure 11:
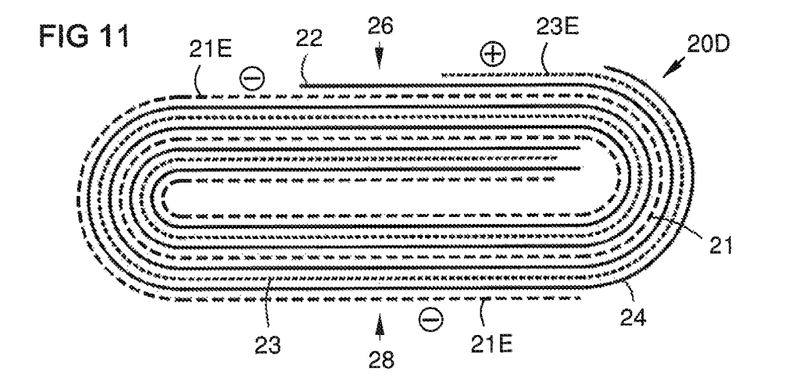
FIG. 11 is a sectional end view of a roll capacitor of a fourth embodiment.

FIG. 11 shows a roll capacitor 20D with inner and outer electrode strips 21, 23, alternating with inner and outer dielectric strips 22, 24. Both electrodes 21, 23 have exposed end portions 21E, 23E on a first side 26 of the roll 20D for electrical contact. The end portion 21E of one of the electrodes 21 also is also exposed on the second side 28 of the roll. Capacitors of this type 20D may be stacked in a parallel pair or a sequential pair. Capacitor 20D of FIG. 11 is similar to capacitor 20B of FIG. 5 in that they both expose both electrodes on one side and only one electrode on the other side. However, they are different in that the one electrode exposed on the other side is the outer electrode 23 in capacitor 20B whereas it is the inner electrode 21 in capacitor 20D.

Figures 12, 13:
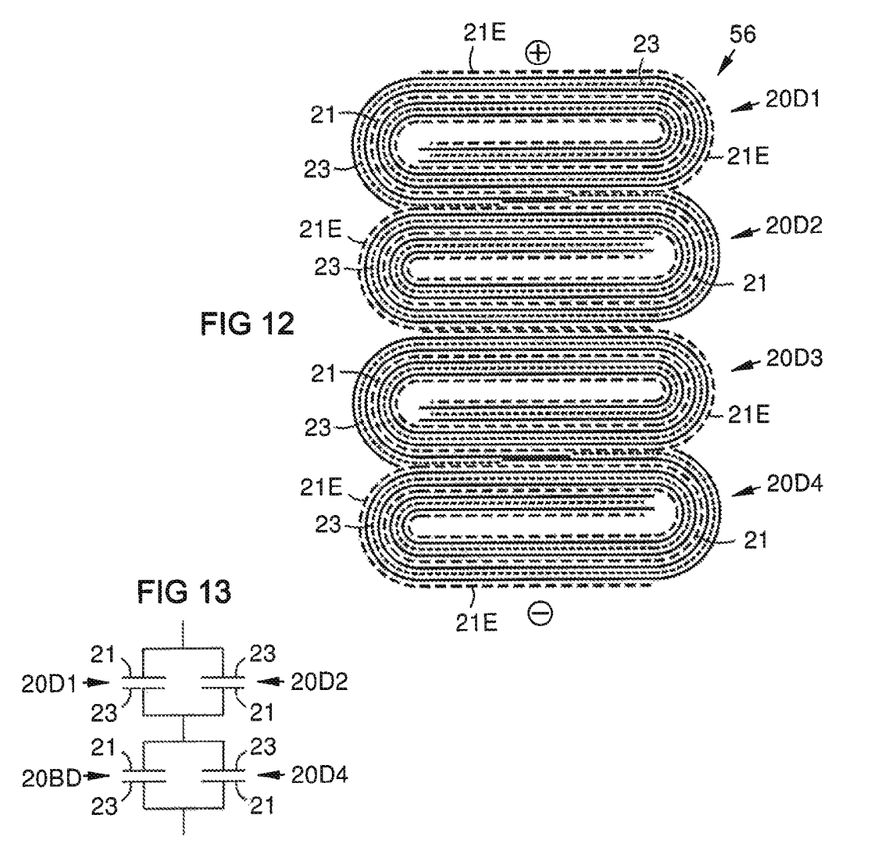
FIG. 12 shows a stack of capacitors of the fourth embodiment.
FIG. 13 shows an electrical diagram of the stack of FIG. 12.

FIG. 12 shows a stack 56 of four electrically interconnected roll capacitors 20D1, 20D2, 20D3 and 20D4. Each capacitor is inverted with respect to the previous capacitor in the stack. The first sides 26 of capacitors 20D1 and 20D2 are in mutual contact, such that both electrodes 21, 23 of 20D1 contact both electrodes 23, 21 of 20D2 in a crossover. This means the inner electrode 21 of capacitor 20D1 contacts the outer electrode 23 of capacitor 20D2, and the outer electrode 23 of 20D1 contacts the inner electrode 21 of 20D2, creating a parallel connection between them as shown in FIG. 13. Capacitor 20D3 is inverted with respect to 20D2 such that their second sides 28 are in mutual contact. In this orientation, capacitors 20D2 and 20D3 are connected in series. Capacitor embodiment 20D allows connecting any two adjacent capacitors either in series or in parallel. If more than two capacitors in a row are to be connected in series or parallel, other embodiments herein, either alone or in combination with embodiment 20D may be used.

Figure 14:
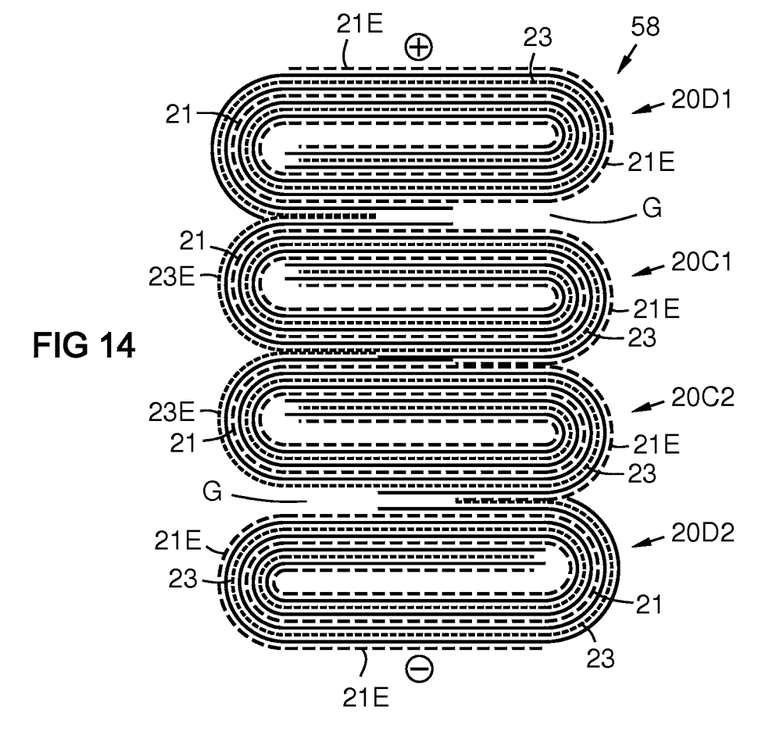
FIG. 14 shows a stack of capacitors of the third and fourth embodiments.
Figure 15:
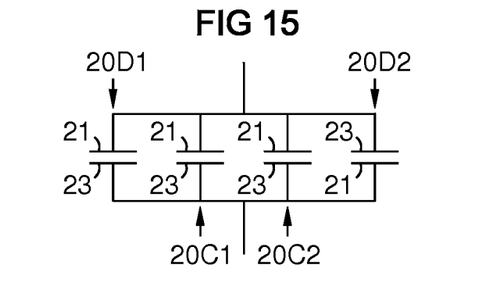
FIG. 15 shows an electrical diagram of the stack of FIG. 14.

FIG. 14 shows a stack 58 of four electrically interconnected roll capacitors 20D1, 2001, 20C2 and 20D4. This stack has parallel connections between 20B1 and 20C1, and between 20C1 and 20C2, and between 20C2 and 20B2 as shown in FIG. 15. Any number of capacitors of type 20C may be interconnected in parallel by stacking them per 20C1 and 20C2. Each end of a stack of capacitors of type 20C can be finished with a capacitor 20D as shown by 20D1 and 20D2. This arrangement provides a single respective + or − stack end contact for circuit connections at each end of the stack 56.

Either or both stack end contacts can alternately be used for a series connection to additional capacitors as later shown. Capacitor 20D2 is inverted with respect to capacitor 20D1 in this stack arrangement 58. Gaps G are eliminated by compression of the stack 56 when installed in a chamber as later described.

Figures 16, 17:
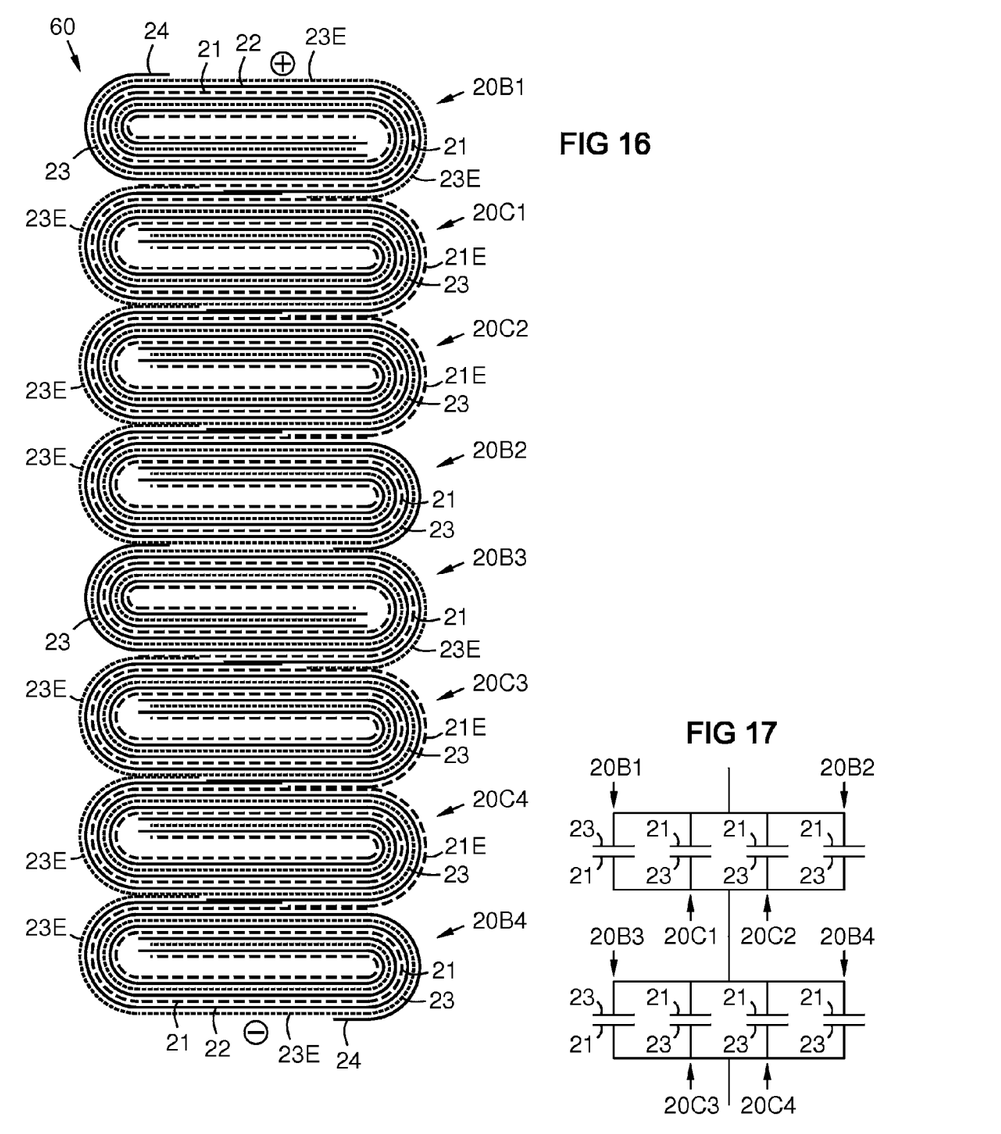
FIG. 16 shows a stack of capacitors of the second and third embodiments.
FIG. 17 shows an electrical diagram of the stack of FIG. 16.

FIG. 16 shows a stack 60 of eight electrically interconnected capacitors 20B1, 20C1, 20C2, 20B2, 20B3, 20C3, 20C4, 20B4, producing the circuit diagram of FIG. 17. This stack can be considered as two sequential stacks of type 54 of FIG. 9. Similarly, multiple stacks of type 58 of FIG. 14 can be stacked, producing multiples of the circuit diagrams of FIG. 15 interconnected in sequence.

Figure 18:
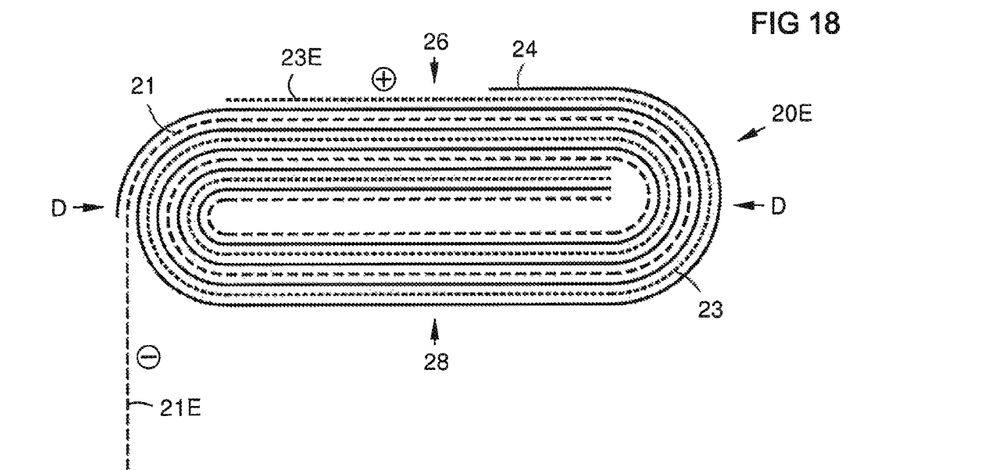
FIG. 18 is a sectional end view of a roll capacitor of a fifth embodiment.
Figure 19:
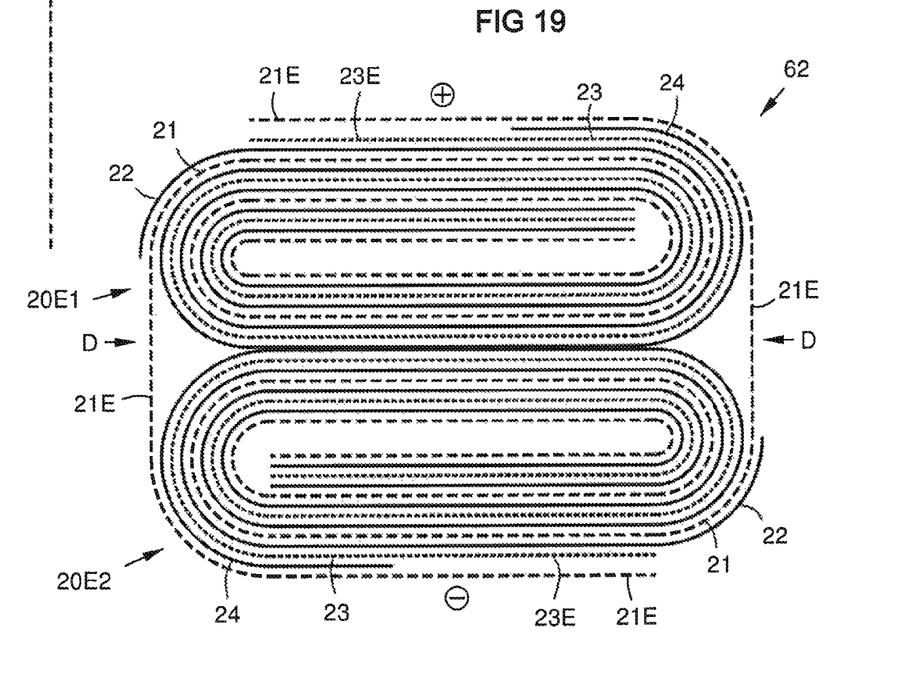
FIG. 19 shows a unit of two capacitors of the fifth embodiment.

FIG. 18 shows a capacitor embodiment 20E that can be combined with a second such capacitor 20E as shown in FIG. 19 to form a dual-roll unit capacitor 62. The dual-roll unit capacitor 62 has twice the capacitance of a single roll capacitor 20E within the same chamber diameter D. FIG. 19 shows two capacitors 20E1, 20E2 assembled into a dual-roll unit capacitor 62 by extending the exposed end 21E of the inner electrode 21 of each roll 20E1, 20E2 around the opposite side of the other roll to contact the exposed outer electrode 23E of the other roll. This forms a parallel interconnection of the two rolls 20E1, 20E2. Multiple unit capacitors 62 can be stacked with other unit capacitors 62, which inherently forms sequential interconnections between them in the stack. The unit capacitor 62 inherently interconnects sequentially with other unit capacitors 62 and/or with other types of capacitors 20A, 20B, 20D in various configurations in a stack of capacitors by direct stacking contact between the exposed ends of the electrodes on respective opposite sides of the unit capacitor 62 and/or the other types of capacitors 20A, 20B, 20D.

Figure 20:
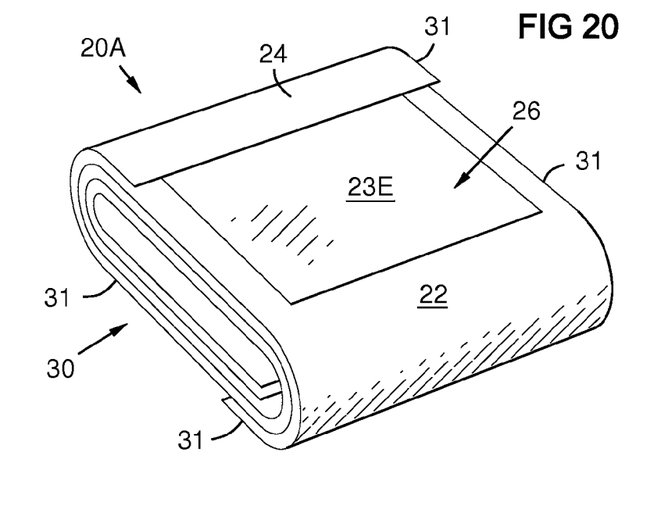
FIG. 20 is a perspective view of a capacitor of the first embodiment.

FIG. 20 shows a perspective view of a capacitor of the first embodiment 20A. The electrodes 21 and 23 are not exposed along ends 30 of the roll because they are covered by overlapping edges 31 of the dielectric strips 22, 24. Advantageously, pluralities of such capacitors can be interconnected in series or in parallel by simply stacking them on top of each other, as described above, without conductive tabs extending from and between the ends 30 (i.e. beyond the footprint) of the adjacent capacitors. This provides a more compact stack than with prior art roll capacitor stacks incorporating such tabs.

Figure 21:
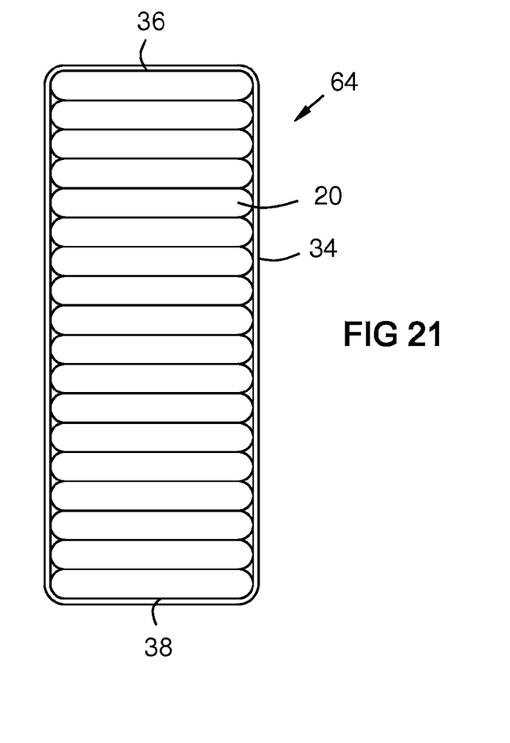
FIG. 21 shows a bound stack of capacitors.

FIG. 21 shows a stack 64 of capacitors 20, held together by a binding strap 34 (not an electrical connection strap) for shipping to a facility for installation into a chamber of an insulator (not shown). Leads (not shown) may be provided on respective plates for placement on the two ends 36, 38 of the stack 64. The stack 64 and leads may be inserted into the chamber of the insulator, where the stack 64 may be held in compression by a spring at an end of the stack (not shown) or by other means. The capacitors 20 of the stack inherently interconnect with each other by direct contact between the exposed ends of the electrodes shown in embodiments 20A-E. No additional connection straps are needed.

Different combinations of series-connected and parallel-connected roll capacitors provide different parameters of voltage, capacitance, resistance, and impedance that can be selected for each application. Thus, it is useful to provide different embodiments that inherently interconnect by direct stacking contact in series, parallel, and combinations of series and parallel without a need for connection tabs extending from an end of the rolls as in the prior art. The capacitors herein provide faster, less expensive, and more reliable fabrication and assembly than prior stacked capacitors.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A capacitor, comprising:
   a roll of four adjacent strips comprising first and second electrode strips alternating with first and second dielectric strips;
   wherein, each of the dielectric strips is shorter at a radially outer end thereof than an inwardly adjacent one of the electrode strips effective to expose a radially outer end of each electrode strip on an outer side surface of the roll.

2. A capacitor according to claim 1, wherein the radially outer ends of the first and second electrode strips are exposed on respective first and second opposite sides of the roll.

3. A capacitor according to claim 2, wherein the radially outer end of at least one of the electrode strips is exposed on both the first and second sides of the roll.

4. A capacitor according to claim 1, wherein the radially outer ends of the first and second electrode strips are exposed only on respective first and second opposite sides of the roll.

5. A capacitor according to claim 1, wherein:
   the radially outer end of the first electrode strip is exposed on both a first side and an opposed second side of the capacitor; and
   the radially outer end of the second electrode strip is exposed only on the first side of the capacitor.

6. First and second capacitors according to claim 5, wherein placing the first sides of the two capacitors together creates a series interconnection of the two capacitors, and placing the second sides of the two capacitors together creates a parallel interconnection of the two capacitors.

7. A capacitor according to claim 1, wherein:
   the radially outer end of the first electrode strip is exposed on both a first side and an opposed second side of the capacitor; and
   the radially outer end of the second electrode strip is exposed on both the first side and on the opposed second side of the capacitor.

8. First and second capacitors according to claim 7, wherein placing the second side of the first capacitor against the first side of the second capacitor creates a parallel interconnection of the two capacitors.

9. A stack of capacitors comprising the first and second capacitors according to claim 8, and further comprising third and fourth roll capacitors on respective opposite ends of the stack, wherein each of the third and fourth roll capacitors comprises:
   a radially outer end of a first electrode strip exposed on both first and second opposite sides of the roll capacitor; and
   a radially outer end of a second electrode strip exposed on only the second side of the roll capacitor;
   wherein the capacitors in the stack are all interconnected in parallel by direct stacking contact between the exposed ends of the respective electrodes of each of the adjacent capacitors.

10. A capacitor, comprising:
    a roll of four adjacent strips comprising inner and outer electrode strips alternating with inner and outer dielectric strips;
    wherein each of the dielectric strips is shorter at a radially outer end thereof than an inwardly adjacent one of the electrode strips effective to expose a radially outer end of each electrode strip on respectively different portions of an outer side surface of the roll;
    wherein "inner" and "outer" mean radially inward and outward in a sequence of the four adjacent strips in an innermost lap of the four adjacent strips.

11. A capacitor according to claim 10, wherein the radially outer ends of the inner and outer electrode strips are exposed on respective first and second opposite sides of the roll.

12. A capacitor according to claim 11, wherein the radially outer end of at least one of the electrode strips is exposed on both the first and second sides of the roll.

13. A capacitor according to claim 10, wherein the radially outer ends of the inner and outer electrode strips are exposed only on respective first and second opposite sides of the roll.

14. A capacitor according to claim 10, wherein:
    the radially outer end of one of the electrode strips is exposed on both a first side and an opposed second side of the capacitor; and
    the radially outer end of the other one of the electrode strips is exposed only on the first side of the capacitor.

15. First and second capacitors according to claim 14, wherein placing the first sides of the two capacitors together creates a series interconnection of the two capacitors, and placing the second sides of the two capacitors together creates a parallel interconnection of the two capacitors.

16. A capacitor according to claim 10, wherein:
    the radially outer end of the inner dielectric strip is exposed on both a first side and an opposed second side of the capacitor; and
    the radially outer end of the outer dielectric strip is exposed on both the first side and on the opposed second side of the capacitor.

17. First and second capacitors according to claim 16, wherein placing the second side of the first capacitor against the first side of the second capacitor creates a parallel interconnection of the two capacitors.

18. A stack of capacitors comprising the first and second capacitors according to claim 17, and further comprising third and fourth roll capacitors on respective opposite ends of the stack, wherein each of the third and fourth roll capacitors comprises:
  a radially outer end of a first electrode strip exposed on both first and second opposite sides of the roll capacitor; and
  a radially outer end of a second electrode strip exposed on only the second side of the roll capacitor;
wherein the capacitors in the stack are all interconnected in parallel by direct stacking contact between the exposed ends of the respective electrode strips of each of the capacitors.

19. A capacitor, comprising:
  at least one roll of four adjacent strips comprising first and second electrode strips alternating with first and second dielectric strips;
  wherein each of the dielectric strips is shorter at a radially outer end thereof than an inwardly adjacent one of the electrode strips effective to expose a radially outer end of each electrode strip; and
  wherein the capacitor is configured to interconnect with other capacitors in a stack of capacitors by direct contact between the exposed ends of the electrode strips without need for any conductive tab to extend beyond a footprint of the capacitor.

20. A capacitor according to claim 19, comprising two rolls of the four adjacent strips;
  wherein the two rolls are interconnected in parallel by extending one of the exposed ends of one of the electrode strips from each of the rolls around the other roll to an opposite side of the other roll.

\* \* \* \* \*